US011156710B2

United States Patent
Liu et al.

(10) Patent No.: US 11,156,710 B2
(45) Date of Patent: Oct. 26, 2021

(54) MILLIMETER WAVE IMAGING APPARATUS

(71) Applicants: CHINA COMMUNICATION TECHNOLOGY CO., LTD., Shenzhen (CN); SHENZHEN INSTITUTE OF TERAHERTZ TECHNOLOGY AND INNOVATION CO., LTD., Shenzhen (CN)

(72) Inventors: Juncheng Liu, Shenzhen (CN); Chao Sun, Shenzhen (CN); Chunchao Qi, Shenzhen (CN)

(73) Assignees: CHINA COMMUNICATION TECHNOLOGY CO., LTD., Shenzhen (CN); SHENZHEN INSTITUTE OF TERAHERTZ TECHNOLOGY AND INNOVATION CO., LTD., Shenzhen (CN)

( * ) Notice: Subject to any disclaimer, the term of this patent is extended or adjusted under 35 U.S.C. 154(b) by 262 days.

(21) Appl. No.: 16/323,206

(22) PCT Filed: Aug. 9, 2016

(86) PCT No.: PCT/CN2016/094110
§ 371 (c)(1),
(2) Date: Feb. 4, 2019

(87) PCT Pub. No.: WO2018/023823
PCT Pub. Date: Feb. 8, 2018

(65) Prior Publication Data
US 2019/0353776 A1 Nov. 21, 2019

(30) Foreign Application Priority Data

Aug. 3, 2016 (CN) .......................... 201610628931.5

(51) Int. Cl.
G01S 13/89 (2006.01)
G01S 7/03 (2006.01)
G01S 7/35 (2006.01)
G01S 13/88 (2006.01)

(52) U.S. Cl.
CPC .............. *G01S 13/89* (2013.01); *G01S 7/032* (2013.01); *G01S 7/354* (2013.01); *G01S 13/887* (2013.01); *G01S 7/358* (2021.05)

(58) Field of Classification Search
CPC ...... G01S 13/89; G01S 13/931; G01S 13/887; G01S 7/32; G01S 7/032; G01S 7/354; G01S 2007/358

(Continued)

(56) References Cited

U.S. PATENT DOCUMENTS 5,325,095 A * 6/1994 Vadnais .............. G01S 13/0209
342/129
5,499,029 A * 3/1996 Bashforth ........... G01S 13/0209
342/129

(Continued)

FOREIGN PATENT DOCUMENTS

CN 2588668 Y 11/2003
CN 101634704 1/2010

(Continued)

*Primary Examiner* — Erin F Heard
*Assistant Examiner* — Michael W Justice
(74) *Attorney, Agent, or Firm* — Maier & Maier, PLLC

(57) ABSTRACT

A millimeter wave imaging apparatus, including: a crystal oscillator, a power divider, a millimeter wave transceiver, a local-oscillation signal processor, a second frequency mixer and an image processor; the power divider performs power distribution on an oscillation signal generated by the crystal oscillator, and outputs a clock trigger signal and a local-oscillation signal; the local-oscillation signal processor processes the local-oscillation signal and outputs a second local-oscillation signal; the millimeter wave transceiver unit processes an echo signal reflected by an object to be (Continued)

detected, and outputs a first intermediate-frequency signal; the second frequency mixer mixes the second local-oscillation signal and the first intermediate-frequency signal, and outputs a second intermediate-frequency signal; the image processor processes the second intermediate-frequency signal, and images the object to be detected. As the crystal oscillator is used as both a clock trigger source and a local-oscillation signal source, the apparatus does not need additional local-oscillation signal sources.

10 Claims, 2 Drawing Sheets

(58) Field of Classification Search
USPC .................................. 342/22, 175, 179, 191
See application file for complete search history.

(56) References Cited

U.S. PATENT DOCUMENTS

| | | | |
|---|---|---|---|
| 5,731,781 A * | 3/1998 | Reed | G01S 13/325 342/135 |
| 6,727,840 B1 * | 4/2004 | Sullivan | G01S 7/021 342/13 |
| 8,362,948 B2 * | 1/2013 | Kolinko | G01S 13/867 342/179 |
| 9,417,315 B2 * | 8/2016 | Palmer | G01S 7/28 |
| 2008/0050013 A1 | 2/2008 | Munro | |
| 2012/0249363 A1 * | 10/2012 | Kolinko | H01Q 19/175 342/179 |
| 2014/0292563 A1 * | 10/2014 | Palmer | G01S 7/032 342/26 R |

FOREIGN PATENT DOCUMENTS

| | | |
|---|---|---|
| CN | 201869164 U | 6/2011 |
| CN | 202818283 | 3/2013 |
| CN | 204031163 | 12/2014 |
| CN | 204304987 U | 4/2015 |
| CN | 104698458 | 6/2015 |
| CN | 105510911 A | 4/2016 |
| CN | 105607056 A | 5/2016 |
| CN | 105759269 A | 7/2016 |
| CN | 205910337 U | 1/2017 |
| EP | 1795914 | 6/2007 |

* cited by examiner

MILLIMETER WAVE IMAGING APPARATUS

PRIORITY INFORMATION

This application is a national stage entry application under 35 U.S.C. 371 of PCT Patent Application No. PCT/CN2016/094110, filed Aug. 9, 2016, which claims priority to Chinese Patent Application No. 201610628931.5, filed Aug. 3, 2016, the entire contents of each of which are incorporated herein by reference.

BACKGROUND

Technical Field

The disclosure belongs to the technical field of millimeter wave imaging, and particularly relates to a millimeter wave imaging apparatus.

Description of Related Art

Millimeter waves are an electromagnetic wave with a wavelength of 1-10 mm, which have good penetrability, reflectivity, and high spatial resolution. Millimeter waves can easily penetrate fabrics, non-metal cartons, various bags, to name but a few, have strong reflectivity for knives, daggers, iron bars, umbrella poles and the like made of metal materials such as iron, steel and aluminum alloy, and are easily absorbed by liquids. Therefore, millimeter wave imaging technology is widely used in the fields of personnel security inspection, landing navigation of aircrafts and so on.

The existing millimeter wave imaging apparatus comprises a millimeter wave transceiver unit and an image processor, wherein the millimeter wave transceiver unit comprises a crystal oscillator, a millimeter wave transceiver unit, a local-oscillation signal source and a frequency mixer, as shown in FIG. 1, the crystal oscillator provides a clock trigger signal for a signal source in the millimeter wave transceiver unit; the local-oscillation signal source provides a local-oscillation signal for the frequency mixer; the millimeter wave transceiver unit transmits a millimeter wave signal to an object to be detected, receives an echo signal reflected by the object to be detected, processes the echo signal and provides a radio frequency signal for the frequency mixer; the frequency mixer mixes the local-oscillation signal and the radio frequency signal and outputs an intermediate-frequency signal; and the image processor forms an image corresponding to the object to be detected according to the intermediate-frequency signal.

However, the existing millimeter wave imaging apparatus uses the crystal oscillator and the additional local-oscillation signal source to provide the clock trigger signal and the local-oscillation signal respectively, while the crystal oscillator could have been used as an oscillation signal source to provide an oscillation signal, but is not fully utilized, resulting in complexity of the whole system and high cost.

BRIEF SUMMARY

Technical Problem

The disclosure aims to provide a millimeter wave imaging apparatus to solve the problem of the existing millimeter wave imaging apparatus using a crystal oscillator and an additional local-oscillation signal source to provide a clock trigger signal and a local-oscillation signal respectively, while the crystal oscillator could have been used as an oscillation signal source but is not fully utilized, resulting in complexity of the whole system and high cost.

Problem Solution

Technical Solution

The disclosure is realized in such a way that a millimeter wave imaging apparatus comprises a millimeter wave transceiver unit and an image processor, wherein the millimeter wave transceiver unit comprises a crystal oscillator, a millimeter wave transceiver unit and a second frequency mixer, the crystal oscillator generates an oscillation signal, a radio frequency input end and an intermediate-frequency output end of the second frequency mixer are connected with an output end of the millimeter wave transceiver unit and an input end of the image processor respectively, and the millimeter wave transceiver unit also comprises a power divider and a local-oscillation signal processor;

a signal input end of the power divider is connected with an output end of the crystal oscillator, a first signal output end and a second signal output end of the power divider are connected with a clock end of the millimeter wave transceiver unit and an input end of the local-oscillation signal processor respectively, and an output end of the local-oscillation signal processor is connected with a local-oscillation input end of the second frequency mixer;

the power divider performs power distribution on the oscillation signal and outputs a clock trigger signal and a local-oscillation signal; the local-oscillation signal processor processes the local-oscillation signal and outputs a second local-oscillation signal; the millimeter wave transceiver unit transmits a millimeter wave signal to an object to be detected and receives an echo signal reflected by the object to be detected under the trigger of the clock trigger signal, and mixes the echo signal and a first local-oscillation signal to output a first intermediate-frequency signal; the second frequency mixer mixes the second local-oscillation signal and the first intermediate-frequency signal, and outputs a second intermediate-frequency signal; and the image processor processes the second intermediate-frequency signal and forms an image corresponding to the object to be detected.

Beneficial Effects

According to a millimeter wave imaging apparatus of the disclosure comprising a crystal oscillator, a power divider, a millimeter wave transceiver unit, a local-oscillation signal processor, a second frequency mixer and an image processor, the power divider performs power distribution on an oscillation signal generated by the crystal oscillator, and outputs a clock trigger signal and a local-oscillation signal; the local-oscillation signal processor processes the local-oscillation signal and outputs a second local-oscillation signal; the millimeter wave transceiver unit processes an echo signal reflected by an object to be detected and outputs a first intermediate-frequency signal; the second frequency mixer mixes the second local-oscillation signal and the first intermediate-frequency signal, and outputs a second intermediate-frequency signal; and the image processor processes the second intermediate-frequency signal, and forms an image corresponding to the object to be detected. As the crystal oscillator is used as both a clock trigger source of the millimeter wave transceiver unit and a local-oscillation signal source of the second frequency mixer, the apparatus does not need additional local-oscillation signal sources, thus simplifying a circuit structure and reducing the costs.

DETAILED DESCRIPTION

In order to make the objects, technical solutions and advantages of the disclosure clearer, the disclosure is further described in detail below with reference to the accompanying drawings and embodiments. It should be understood that the specific embodiments described herein are only used to illustrate the present disclosure and are not configured to limit the present disclosure.

According to a millimeter wave imaging apparatus in an embodiment of the disclosure comprising a crystal oscillator, a power divider, a millimeter wave transceiver unit, a local-oscillation signal processor, a second frequency mixer and an image processor, the power divider performs power distribution on an oscillation signal generated by the crystal oscillator, and outputs a clock trigger signal and a local-oscillation signal; the local-oscillation signal processor processes the local-oscillation signal and outputs a second local-oscillation signal; the millimeter wave transceiver unit processes an echo signal reflected by an object to be detected and outputs a first intermediate-frequency signal; the second frequency mixer mixes the second local-oscillation signal and the first intermediate-frequency signal, and outputs a second intermediate-frequency signal; and the image processor processes the second intermediate-frequency signal, and forms an image corresponding to the object to be detected. As the crystal oscillator is used as both a clock trigger source of the millimeter wave transceiver unit and a local-oscillation signal source of the second frequency mixer, the apparatus does not need additional local-oscillation signal sources, thus simplifying a circuit structure and reducing the costs.

Figure 1:
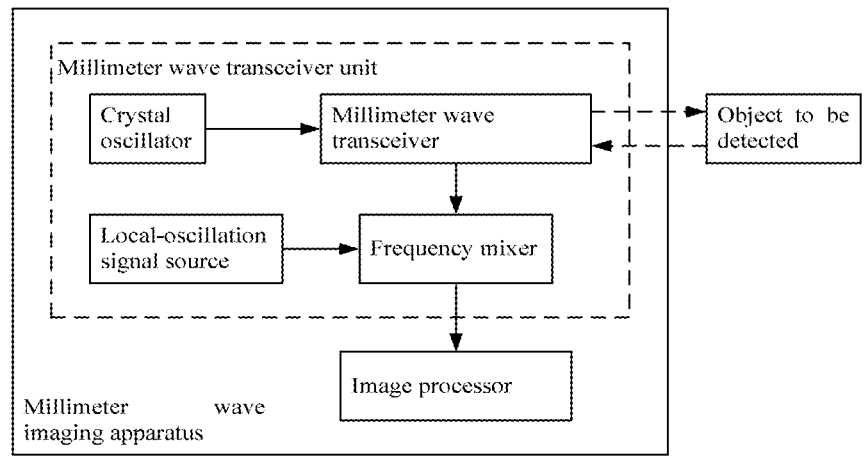
FIG. 1 is a structural diagram of a millimeter wave imaging apparatus.
Figure 2:
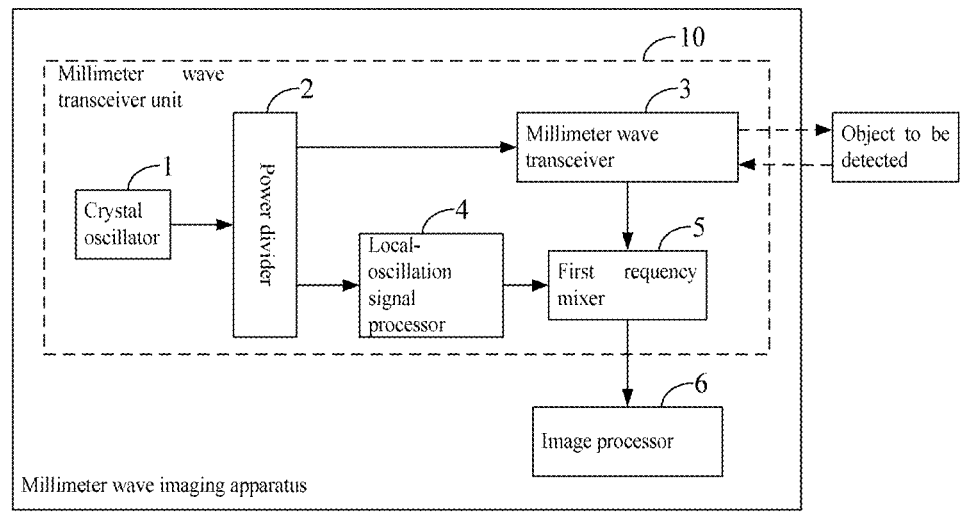
FIG. 2 is a modular structure diagram of a millimeter wave imaging apparatus provided in an embodiment of the present disclosure.

FIG. 2 shows a modular structure of the millimeter wave imaging apparatus provided in the embodiment of the present disclosure, for ease of illustration, only those related to the embodiment of the present disclosure are shown, as detailed below:

a millimeter wave imaging apparatus comprises a millimeter wave transceiver unit 10 and an image processor 6, wherein the millimeter wave transceiver unit 10 comprises a crystal oscillator 1, a millimeter wave transceiver 3 and a first frequency mixer 5, a radio frequency input end and an intermediate-frequency output end of the first frequency mixer 5 are connected with an output end of the millimeter wave transceiver 3 and an input end of the image processor 6 respectively, and the millimeter wave transceiver unit 10 also comprises a power divider 2 and a local-oscillation signal processor 4.

A signal input end of the power divider 2 is connected with an output end of the crystal oscillator 1, a first signal output end and a second signal output end of the power divider 2 are connected with a clock end of the millimeter wave transceiver 3 and an input end of the local-oscillation signal processor 4 respectively, and an output end of the local-oscillation signal processor 4 is connected with a local-oscillation input end of the first frequency mixer 5.

The power divider 2 performs power distribution on the oscillation signal and outputs a clock trigger signal and a local-oscillation signal; the local-oscillation signal processor 4 processes the local-oscillation signal and outputs a second local-oscillation signal; the millimeter wave transceiver 3 transmits a millimeter wave signal to an object to be detected and receives an echo signal reflected by the object to be detected under the trigger of the clock trigger signal, and mixes the echo signal and a first local-oscillation signal to output a first intermediate-frequency signal; the first frequency mixer 5 mixes the second local-oscillation signal and the first intermediate-frequency signal, and outputs a second intermediate-frequency signal; and the image processor 6 processes the second intermediate-frequency signal and forms an image corresponding to the object to be detected.

In the embodiment of the present disclosure, the oscillation frequency of the crystal oscillator 1 is a fixed frequency and equal to the frequency of the first intermediate-frequency signal, for example, the oscillation frequency of the crystal oscillator 1 and the frequency of the first intermediate-frequency signal are both 200 MHz.

In the embodiment of the present disclosure, the power divider 2 is a division multi-way power divider. In practical application, the power divider 2 can be a passive multi-way power divider, a multi-way coupler, or an active multi-way power divider, a multi-way coupler, a multi-way switch, etc.

In the embodiment of the present disclosure, the crystal oscillator 1 serves as both the clock trigger source of the millimeter wave transceiver 3 and the local-oscillation signal source of the first frequency mixer 5, so the utilization rate of the crystal oscillator 1 is high, an additional local-oscillation signal source can be saved, circuit wiring can be simplified, integration and miniaturization of the millimeter wave imaging apparatus are made easier, and the costs are reduced.

Figure 3:
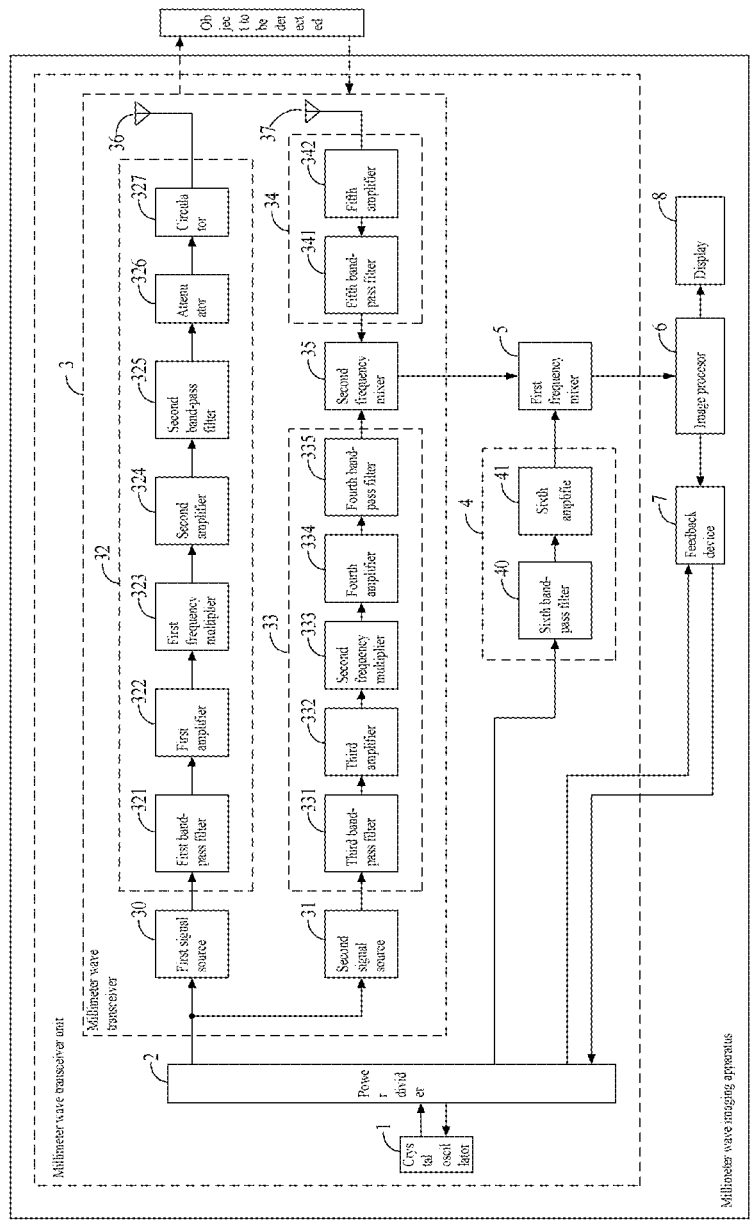
FIG. 3 is a circuit structure diagram of a millimeter wave imaging apparatus provided in an embodiment of the present disclosure.

FIG. 3 shows a circuit structure of the millimeter wave imaging apparatus provided in the embodiment of the present disclosure, for ease of illustration, only those related to the embodiment of the present disclosure are shown, as detailed below:

as an embodiment of the present disclosure, the millimeter wave transceiver 3 comprises a first signal source 30, a second signal source 31, a first signal processor 32, a second signal processor 33, a transmitting antenna 36, a receiving antenna 37, an echo signal processor 34, and a second frequency mixer 35.

A clock end of the first signal source 30 and a clock end of the second signal source 31 are connected to serve as a clock end of the millimeter wave transceiver 3, an output end of the first signal source 30 and an output end of the second signal source 31 are connected with an input end of the first signal processor 32 and an input end of the second signal processor 33 respectively, and an output end of the first signal processor 32 is connected with the transmitting antenna 36. An input end of the echo signal processor 34 is connected with the receiving antenna 37, a local-oscillation signal input end and a radio frequency signal input end of the second frequency mixer 35 are connected with an output end of the second signal processor 33 and an output end of the echo signal processor 34 respectively, and an intermediate-frequency output end of the second frequency mixer 35 is an output end of the millimeter wave transceiver 3.

The first signal source 30 and the second signal source 31 output a first signal and a second signal simultaneously and respectively under the trigger of the clock trigger signal. The first signal processor 32 performs frequency doubling processing on the first signal and outputs a millimeter wave signal, and the transmitting antenna 36 transmits the millimeter wave signal to the object to be detected. The second signal processor 33 performs frequency doubling processing on the second signal and outputs the first local-oscillation signal. The receiving antenna 37 receives the echo signal reflected by the object to be detected. The echo signal processor 34 filters and amplifies the echo signal and outputs a first echo signal. The second frequency mixer 35 mixes the first local-oscillation signal and the first echo signal and outputs the first intermediate-frequency signal.

In the embodiment of the present disclosure, the phase of the first local-oscillation signal is the same as that of the first echo signal.

In the embodiment of the present disclosure, both the first signal source 30 and the second signal source 31 are sweep signal sources, that is, the frequency of sine wave signals output by the first signal source 30 and the second signal source 31 is repeatedly scanned within a certain range over time, and the sweep signal source is composed of a phase locked loop which can input an external reference signal. The sweep frequency range and sweep bandwidth of the first signal source 30 and the second signal source 31 can be set according to actual requirements.

In the embodiment of the present disclosure, the millimeter wave signal transmitted by the transmitting antenna 36 is a sweep signal with a certain bandwidth, and the frequency range of the echo signal received by the receiving antenna 37 is the same as the frequency range of the millimeter wave signal transmitted by the transmitting antenna.

In the embodiment of the present disclosure, the second frequency mixer 35 is a difference frequency mixer.

As an embodiment of the present disclosure, the first signal processor 32 comprises a first band-pass filter 321, a first amplifier 322, a first frequency multiplier 323, a second amplifier 324, a second band-pass filter 325, an attenuator 326 and a circulator 327 connected in sequence. An input end of the first band-pass filter 321 and an output end of the circulator 327 are an input end and an output end of the first signal processor 32 respectively.

As an embodiment of the present disclosure, the second signal processor 33 comprises a third band-pass filter 331, a third amplifier 332, a second frequency multiplier 333, a fourth amplifier 334, and a fourth band-pass filter 335 connected in sequence. An input end of the third band-pass filter 331 and an output end of the fourth band-pass filter 335 are an input end and an output end of the second signal processor 33 respectively.

In the embodiment of the present disclosure, the first frequency multiplier 323 and the second frequency multiplier 333 are both frequency doublers.

As an embodiment of the present disclosure, the echo signal processor 34 comprises a fifth amplifier 342 and a fifth band-pass filter 341 connected in sequence. An input end of the fifth amplifier 342 and an output end of the fifth band-pass filter 341 are an input end and an output end of the echo signal processor 34 respectively.

As an embodiment of the present disclosure, the local-oscillation signal processor 4 comprises a sixth band-pass filter 40 and a sixth amplifier 41 connected in sequence. An input end of the sixth band-pass filter 40 and an output end of the sixth amplifier 41 are an input end and an output end of the local-oscillation signal processor 4 respectively.

As an embodiment of the present disclosure, the first frequency mixer 5 is an in-phase/quadrature frequency mixer (I/Q frequency mixer). The in-phase/quadrature frequency mixer consists of two frequency mixers, a 90-degree bridge and an in-phase power divider.

In practical application, the frequency range of the first signal output by the first signal source 30 is 16.1-20.1 GHz. The first signal is subjected to clutter filtration, amplification and frequency doubling processing by the first band-pass filter 321, the first amplifier 322 and the first frequency multiplier 323 in sequence to generate a millimeter wave signal with a frequency range of 32.2-40.2 GHz. Since the attenuation of the first frequency multiplier 323 is large, the millimeter wave signal output by the first frequency multiplier 323 can be transmitted by the transmitting antenna 36 only after being subjected to amplification, fundamental harmonic and third harmonic filtration and power adjustment by the second amplifier 324, the second band-pass filter 325, and the attenuator 326 in sequence. The role of the circulator 327 is to prevent the influence of clutter signals received by the transmitting antenna 36 on the front-end devices. The frequency range of the second signal output by the second signal source 31 is 16-20 GHz. The second signal source is subjected to clutter filtration, amplification and frequency doubling processing by the third band-pass filter 331, the third amplifier 332 and the second frequency multiplier 333 in sequence to generate a first local-oscillation signal with a frequency range of 32-40 GHz. The first local-oscillation signal is subjected to amplification and fundamental harmonic and third harmonic filtration by the fourth amplifier 334 and the fourth band-pass filter 335 in sequence, and then output to a local-oscillation signal input end of the second frequency mixer 35. The initial sweep frequency of the first signal source 30 is not fixed at 16.1 GHz, and the sweep bandwidth is not fixed at 4 GHz; the initial sweep frequency of the second signal source 31 is not fixed at 16 GHz, and the sweep bandwidth is not fixed at 4 GHz; it is only necessary to ensure that there is a fixed frequency difference between the initial sweep frequency of the first signal source 30 and the initial sweep frequency of the second signal source 31, which is equal to the frequency of the first intermediate-frequency signal. The frequency range of the echo signal received by the receiving antenna 37 is 32.2-40.2 GHz. The echo signal processor 34 sequentially performs amplification and clutter filtration on the echo signal through the fifth amplifier 342 and the fifth band-pass filter 341 respectively to generate a first echo signal, and outputs the first echo signal to a radio frequency signal input end of the second frequency mixer 35.

In practical application, the first signal source 30 and the second signal source 31 output the first signal and the second signal simultaneously and respectively, that is, the first band-pass filter 30 and the second band-pass filter 31 receive the first signal and the second signal simultaneously and respectively. By setting the transmission path (length of transmission line) of the first signal and the second signal accordingly, the phases of the first local-oscillation signal and the first echo signal input to the second frequency mixer 35 are always kept absolutely equal, so that the frequency of the first intermediate-frequency signal output by the second frequency mixer 35 is always a fixed value (e.g., 200 MHz). Since the oscillation frequency of the crystal oscillator 1 is equal to the frequency of the first intermediate-frequency signal, the frequency of the local-oscillation signal is 200 MHz, the local-oscillation signal is filtered by the sixth band-pass filter 40 and amplified by the sixth amplifier 41 to form a second local-oscillation signal (frequency is 200 MHz), the first frequency mixer 5 demodulates the second local-oscillation signal and the first intermediate-frequency signal and then outputs two DC signals, an in-phase signal and a quadrature signal, and the image processor 6 collects and processes the in-phase signal and the quadrature signal and images the object to be detected according to a processing result. In practical application, the millimeter wave imaging apparatus also comprises a display 8, an input end of which is connected with a first output end of the image processor 6, and the display 8 is used to display the image corresponding to the object to be detected.

As an embodiment of the present disclosure, the millimeter wave imaging apparatus further comprises a feedback device 7, wherein a first input end, a second input end and a feedback output end of the feedback device 7 are connected with a second output end of the image processor 6, a third output end of the power divider and a feedback input end of the power divider respectively; meanwhile, a feedback output end of the power divider 2 is connected with a feedback input end of the crystal oscillator 1, and the feedback device 7 is used for adjusting the oscillation frequency of the crystal oscillator 1 according to the imaging of the image processor 6. In practical application, the feedback device 7 is specifically an FPGA (Field-Programmable Gate Array) control board.

As an embodiment of the present disclosure, the millimeter wave imaging apparatus also comprises a power module which supplies power to the entire apparatus.

According to the millimeter wave imaging apparatus in the embodiment of the disclosure comprising the crystal oscillator, the power divider, the millimeter wave transceiver unit, the local-oscillation signal processor, the second frequency mixer and the image processor, the power divider performs power distribution on the oscillation signal generated by the crystal oscillator, and outputs the clock trigger signal and a local-oscillation signal; the local-oscillation signal processor processes the local-oscillation signal and outputs the second local-oscillation signal; the millimeter wave transceiver unit processes the echo signal reflected by the object to be detected and outputs the first intermediate-frequency signal; the second frequency mixer mixes the second local-oscillation signal and the first intermediate-frequency signal, and outputs the second intermediate-frequency signal; and the image processor processes the second intermediate-frequency signal, and forms the image corresponding to the object to be detected. As the crystal oscillator is used as both the clock trigger source of the millimeter wave transceiver unit and the local-oscillation signal source of the second frequency mixer, the apparatus does not need additional local-oscillation signal sources, thus simplifying a circuit structure and reducing the costs.

The above is example embodiment of the present disclosure and is not intended to limit the present disclosure. Any modifications, equivalent substitutions, improvements, etc., made within the spirit and principles of the present disclosure should be included within the scope of protection of the present disclosure.

What is claimed is:

1. A millimeter wave imaging apparatus, comprising:
   an image processor having an input end;
   a millimeter wave transceiver unit, including:
      a crystal oscillator configured to generate an oscillation signal;
      a millimeter wave transceiver having an output end;
      a first frequency mixer having a radio frequency input end and an intermediate-frequency output end;
      a power divider; and
      local-oscillation signal processor;
   wherein the radio frequency input end and the intermediate-frequency output end of the first frequency mixer are respectively connected to the output end of the millimeter wave transceiver and to the input end of the image processor;
   wherein a signal input end of the power divider is connected to an output end of the crystal oscillator,
   wherein a first signal output end and a second signal output end of the power divider are respectively connected to a clock end of the millimeter wave transceiver and an input end of the local-oscillation signal processor,
   wherein an output end of the local-oscillation signal processor is connected to a local-oscillation input end of the first frequency mixer,
   wherein the power divider performs a power distribution operation on the oscillation signal and outputs a clock trigger signal and a first local-oscillation signal,
   wherein the local-oscillation signal processor processes the first local-oscillation signal and outputs a second local-oscillation signal,
   wherein the millimeter wave transceiver transmits a millimeter wave signal to an object and receives an echo signal reflected by the object under the trigger of the clock trigger signal, and mixes the echo signal and the first local-oscillation signal to output a first intermediate-frequency signal,
   wherein the first frequency mixer mixes the second local-oscillation signal and the first intermediate-frequency signal, and outputs a second intermediate-frequency signal, and
   wherein the image processor processes the second intermediate-frequency signal and forms an image corresponding to the object.

2. The apparatus according to claim 1, wherein the millimeter wave transceiver comprises:
   a first signal source,
   a second signal source,
   a first signal processor;
   a second signal processor;
   a transmitting antenna;
   a receiving antenna;
   an echo signal processor; and
   a second frequency mixer,
   wherein a clock end of the first signal source and a clock end of the second signal source are connected to serve as a clock end of the millimeter wave transceiver,
   wherein an output end of the first signal source and an output end of the second signal source are connected to an input end of the first signal processor and an input end of the second signal processor respectively, and
   wherein an output end of the first signal processor is connected to the transmitting antenna,
   wherein an input end of the echo signal processor is connected to the receiving antenna,
   wherein a local-oscillation signal input end and a radio frequency signal input end of the second frequency mixer are connected to an output end of the second signal processor and an output end of the echo signal processor respectively,
   wherein an intermediate-frequency output end of the second frequency mixer is an output end of the millimeter wave transceiver, wherein the first signal source and the second signal source output a first signal and a second signal simultaneously and respectively under the trigger of the clock trigger signal, wherein the first signal processor performs frequency doubling processing on the first signal and outputs a millimeter wave signal, wherein the transmitting antenna transmits the millimeter wave signal to the object, wherein the second signal processor performs frequency doubling processing on the second signal and outputs a first local-oscillation signal, wherein the receiving antenna receives an echo signal reflected by the object, wherein the echo signal processor filters and amplifies the echo signal and outputs a first echo signal, and wherein the second frequency mixer mixes the first local-oscillation signal and the first echo signal and outputs a first intermediate-frequency signal.

3. The apparatus according to claim 2, wherein the first signal processor comprises:
a first band-pass filter;
a first amplifier;
a first frequency multiplier;
a second amplifier;
a second band-pass filter; and
an attenuator and a circulator connected in series;
wherein an input end of the first band-pass filter and an output end of the circulator are connected to an input end and an output end of the first signal processor, respectively.

4. The apparatus according to claim 2, wherein the second signal processor comprises:
a third band-pass filter;
a third amplifier;
a second frequency multiplier; and
a fourth amplifier and a fourth band-pass filter connected in series;
wherein an input end of the third band-pass filter and an output end of the fourth band-pass filter are connected to an input end and an output end of the second signal processor, respectively.

5. The apparatus according to claim 2, wherein the echo signal processor comprises:
a fifth amplifier and a fifth band-pass filter connected in series;
wherein an input end of the fifth amplifier and an output end of the fifth band-pass filter are connected to an input end and an output end of the echo signal processor, respectively.

6. The apparatus according to claim 2, the wherein a phase of the first local-oscillation signal coincides with a phase of the first echo signal.

7. The apparatus according to claim 2, the wherein an oscillation frequency of the crystal oscillator coincides with a frequency of the first intermediate-frequency signal.

8. The apparatus according to claim 2, wherein both the first signal source and the second signal source are sweep signal sources.

9. The apparatus according to claim 1, wherein the local-oscillation signal processor comprises:
a sixth band-pass filter and a sixth amplifier connected in sequence,
wherein an input end of the sixth band-pass filter is connected to the second signal output end of the power divider and an output end of the sixth amplifier is connected to the first frequency mixer.

10. The apparatus according to claim 1, wherein the first frequency mixer is an in-phase frequency mixer or a quadrature frequency mixer.

* * * * *